Dec. 27, 1955  R. G. SCHMITT ET AL  2,728,570
AUTOMATIC GATE
Filed May 17, 1954  2 Sheets-Sheet 1

INVENTORS:
Roland G. Schmitt
BY Vernon E. Swedberg

Att'y

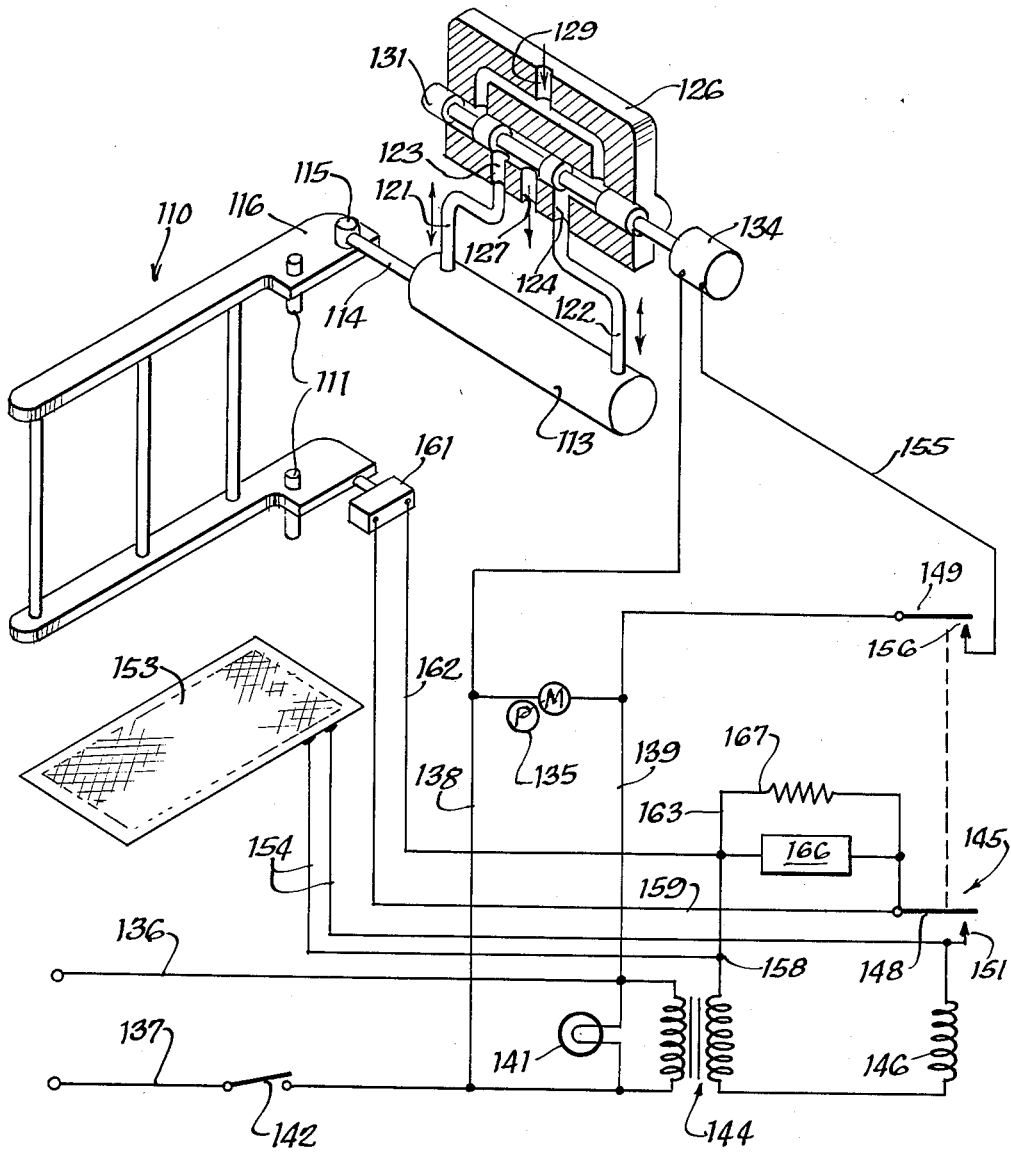

United States Patent Office 2,728,570
Patented Dec. 27, 1955

2,728,570
AUTOMATIC GATE

Roland G. Schmitt and Vernon K. Swedberg, Chicago, Ill., assignors to Walgreen Co., Chicago, Ill., a corporation of Illinois Application May 17, 1954, Serial No. 430,098

4 Claims. (Cl. 268—33)

This invention relates to an automatic gate. In particular it has reference to a gate of the type adapted for use in self-service stores whereby entrance to the merchandise area is had upon pedal actuation of some device by the user's person and, after remaining open for a brief period to permit passage, closes automatically. Moreover, the gate operating mechanism desirably includes means for preventing manual opening of the gate for passage in the reverse direction.

The principal object of the invention resides in providing a gate having the foregoing characteristics which may be shipped as a simple unit, the operating mechanism being designed for containment within a post upon which the gate is hung except that, in a preferred embodiment, the actuating switch is formed as a floor mat upon which a person approaching the gate is obliged to step.

Another object lies in attaining the foregoing object by extremely simple means of the utmost reliability, as contrasted with those arrangements which incorporate a photocell and light beam interrupted by the person's body.

Other objects will appear from the following description which, taken with the accompanying drawing, discloses preferred arrangements for carrying the invention into practice.

In this drawing:

Fig. 3 is a similar showing of an alternative form of the invention which, in part, utilizes hydraulic pressure.

Figure 1:
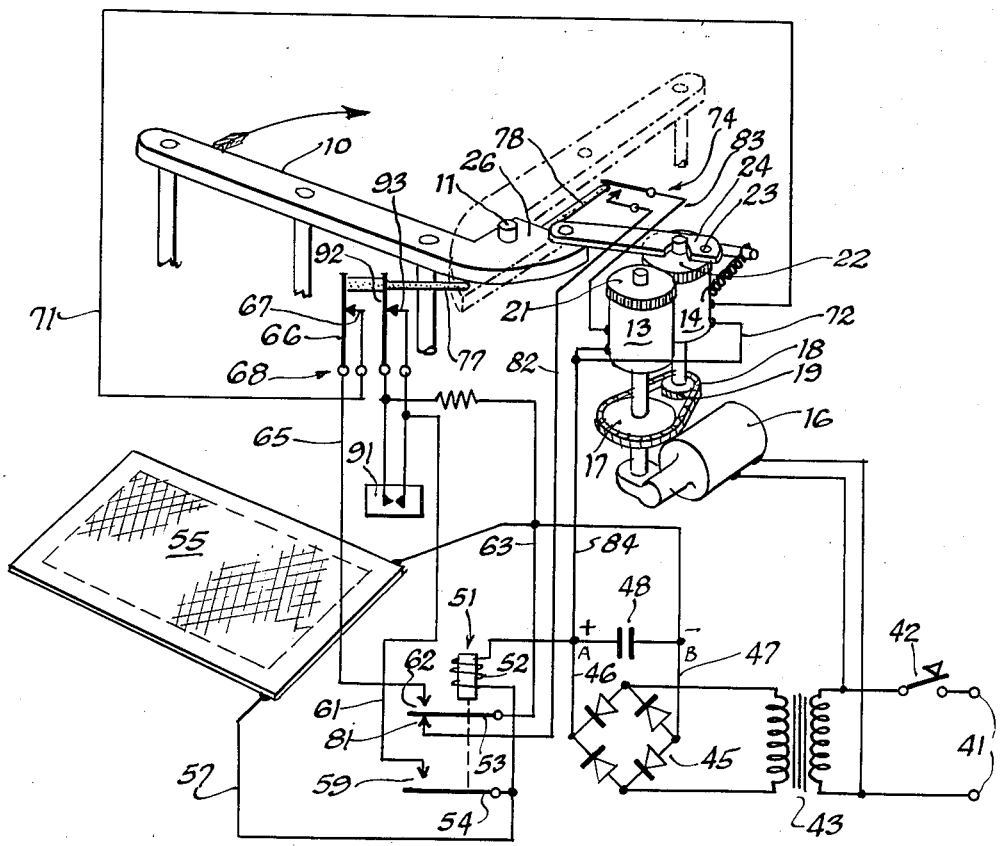
Fig. 1 is a schematic showing of one form of the invention operating solely on electric current.

Turning first to Fig. 1 a gate 10 of any suitable construction is supported for swinging movement on a pair of pivots 11, only one of which is shown in the interests of clarity.

It is contemplated that all of the operating mechanism, except the floor switch, is positioned within a hollow post (not shown) upon which the gate is hung. To this end we provide therein a pair of electromagnetic clutches 13 and 14, input power for which is derived from a gear reduction motor 16 driving a sprocket 17 linked by a chain 18 to a smaller sprocket 19. Sprockets 17 and 19 are attached to shafts forming part of the driving elements of the respective clutches 13 and 14 whose output gears 21 and 22 are in mesh.

Figure 2:
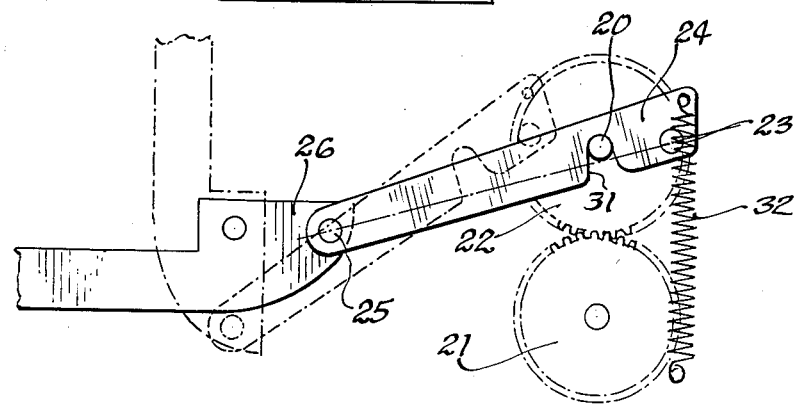
Fig. 2 is a top plan view of certain details of Fig. 1.

Gear 22 (Fig. 2) is provided with a crank pin 23 connected to a link 24, in turn articulated at 25 to an extension 26 of the gate 10, and whereby rotation of the gear 22 is effective to open and close the gate with a positive action. Thus, the pin 23 associated with a center of rotation 20 may be said to constitute the gear 22 a crank arm. In order to prevent manual opening of the gate, as by mischievous children, or by adults attempting to use an entrance gate for exit or vice versa, the link 24 and pin 23 are so arranged that, in the full closed position, the line joining the centers of the pivot 25 and pin 23 lies on that side of the output shaft 20 of the clutch 14 corresponding to the direction in which link 24 would have to move if the gate is attempted to be swung by manual force. Stated otherwise, the gate opens by rotation in a clockwise direction so that an attempt to open the gate manually would exert pull on the link 24 toward the left. However, since the center of the pin 23 lies on a line through the center of the pin 25 which is offset forwardly from the center of the shaft 20, pull on the link 24 will tend to rotate the gear 22 also clockwise. Such action is prevented by abutment of the link against the shaft 20. The notch 31 allows the link 24 to take up the position shown in Fig. 2. Accordingly, such reverse action is prohibited. A tension spring 32 retains the parts in the full line relative position shown notwithstanding interruption in current to the clutches.

The electrical circuitry will now be described. A convenient source of alternating current 41 is connected, via a line switch 42, to a step-down transformer 43 to provide a safe, low voltage to those parts of the system which are likely to be accidentally touched. A bridge rectifier 45 provides full-wave, rectified current to leads 46 and 47. Numeral 48 indicates a smoothing condenser.

A relay 51 includes energizing winding 52 and armatures 53 and 54 whereby the floor mat switch 55 is instrumental in opening the gate as follows: the weight of an individual on the mat 55 closes a circuit from lead 47 through lead 57, coil 52 to lead 46 and armatures 53 and 54 are pulled in. Armature 54 and its contact 59 establish a holding circuit for the relay via lead 61, contacts 92 and 93 of a switch 68 or contacts of delay device 91 (both to be explained hereinafter) to power on lead 47. Armature 53 and its front contacts 62 establish a circuit from lead 47 via branch 63, through lead 65, closed tongue 66 and its contact 67 of the switch 68, through lead 71 to the coil of clutch 14, and thence to power at 46 through lead 72. Upon such energization of the clutch its output is coupled to the gear 22 for counterclockwise rotation and opening of the gate.

Upon partial opening of the gate a circuit is prepared, through closing of a switch 74, to the coil of clutch 13 and to be further described. Upon full opening of the gate the circuit through tongue 66 and contact 67 is opened and the clutch 14 is deenergized. Operation of switches 68 and 74 through the respective buttons 77 and 78 thereof is believed to be apparent from the drawing. Although shown for convenience diagrammatically these switches are preferably so-called "micro-switch" type.

Closing of the gate is accomplished automatically following a predetermined pause in open position to allow comfortable passage. Thus, upon dropping out of the relay 51 by opening of the circuit previously found through contacts 66 and 67, a circuit is formed as follows: line 47, branch 63, armature 53 and back contact 81, line 82, now-closed contacts of switch 74, line 83 to coil of clutch 13, thence over lead 84 to the other side of the line at 46. Thus output gear 21 is rotated and, since clutch 14 is now deenergized, the gear 22 may rotate gear 21 in a clockwise sense to close the gate. It will be recalled that at the end of the opening movement the contacts 66 and 67 were opened. Consequently, if no delay were provided the gate would close prematurely and passage impeded or rendered awkward. To remedy this situation a delay device 91 is incorporated in parallel with another set of contacts 92 and 93 of the switch 68 which are parallel with leads 61 and 63. Thus, as long as contacts 92 and 93 remain closed, i. e. during closed or partially open positions of the gate, the delay device 91 is shorted out and is ineffective. Contrariwise, upon full opening of the gate the contacts 92 and 93 are opened to introduce a closed circuit between lines 61 and 47, via the switch incorporated in device 91, and the clutch 14 remains energized until the preselected time interval has expired, whereupon the circuit through the device 91 is opened, the relay holding circuit is interrupted, and the relay may drop out.

An alternative arrangement is shown in Fig. 3 in which hydraulic means are substituted for the contrarotative electromagnetic clutches heretofore described.

Turning to the drawing a gate 110 is arranged for swinging on pivots 111—111 carried in a hollow post (not shown) within which all of the other components to be described may be conveniently carried if desired. As will appear, the hydraulic pressure required for actuation of the gate is obtained from a motor-driven pump situated within the post.

Such actuation of the gate occurs mechanically through the medium of a hydraulic cylinder 113 fitted within the post and having its piston rod 114 pivotally connected at 115 to an extension 116 of the gate.

Fluid is admitted to and exhausted from the cylinder 113 via an inlet pipe 121 and an exhaust pipe 122 connected to respective ports 123 and 124 of a valve 126. Exhaust is by way of a port 127 to a reservoir (not shown) and inlet is by way of a port 129 communicating with the reservoir.

A valve stem 131 is arranged to slide in the valve body and is provided with segments arranged to switch the inlet and exhaust connections to the cylinder between the inlet and exhaust ports of the valve in a common manner and as will be understood. The necessary two positions of the valve are obtained by means of a solenoid 134 having an actuated condition and a rest condition, one of which is the result of spring bias.

Fluid pressure is derived from a motor driven pump 135 connected to the main supply lines 136 and 137 by means of conductors 138 and 139. A signal lamp 141 indicates that the main switch 142 is closed.

A transformer 144 steps down the line voltage prior to the winding 146 of a relay 145 which includes an operating coil 146 and armatures 148 and 149. Armature 148 and its contact 151 serve to hold the relay 145 closed for the necessary position of a cycle notwithstanding reopening of the initiating contacts.

Positioned before the gate 110 is a mat-type of switch 153 of the type heretofore referred to. This switch is connected via leads 154—154 in series with the coil 146 and secondary of the transformer 144 in order that closing of the switch will energize the relay.

Upon such event armatures 148 and 149 close their respective circuits, the first of which may be traced through from power lead 137 through lead 138, solenoid 134, lead 155, contact 156, armature 149 and lead 139 to the other power lead 136; and the second of which is traced from power at junction 158, leads 154—154 to coil 146. Another circuit is found from contact 151 now-closed armature 148, lead 159, gate switch 161, leads 162 and 163 to secondary of transformer 144 whereby to establish a holding circuit for the relay coil 146 notwithstanding opening of the switch 153. Accordingly, the circuit just closed through the solenoid 134 will remain closed through tongue 149 and contact 156 until such time as the holding circuit of the relay is released. However, such circuit is opened through switch 161 upon opening of the gate, subject to any needed time delay to permit the customer clear passage through the gate. Such delay is introduced through a device 166 of any common type which is connected in parallel with the switch 161 and therefore effectively prolongs its initial action for any predetermined period whereupon the circuit is opened, the relay 145 drops out and the solenoid 134 returns to its former position. Such action will shift the valve 131 to close the gate. Resistor 167 is provided to protect the contact 151 and its companion contact against pitting. Following reclosing of the gate the switch 161 is restored to operative condition.

From the foregoing it will have been comprehended that we have provided novel forms of an automatic gate comprising simple, foolproof components and without the complexities and maintenance incident upon those arrangements employing electronic devices, such as photocells and amplifiers which are prone to give difficulty. Accordingly, maintenance is reduced to the minimum.

While we have shown particular embodiments of our invention, it will be understood, of course, that we do not wish to be limited thereto since many modifications may be made, and we therefore contemplate by the appended claims to cover any such modifications as fall within the true spirit and scope of our invention.

We claim:

1. An automatic gate comprising a gate pivotally supporting for swinging movement from closed to open position and vice versa, power-driven rotatable means for swinging said gate, a crank arm rotatable with said rotatable means, a link connecting a rotatable point of said gate and the free end of said arm, and a fixed abutment positioned along the length of the link between said point and free end for arresting movement of said link in one direction, said direction being opposite to that in which said link moves when power is applied to open the door and whereby said gate cannot be forced open manually by back-driving the gate-opening means.

2. An automatic gate combining a gate pivotally supported for swinging movement, a pair of clutches, power means for driving the input sides of said clutches in the same direction, means connecting the output sides of said clutches for rotation in opposite directions, means connecting one of said output sides to said gate, and means operable selectively to activate one of said clutches for operating said connecting means to open said gate, and to activate the other of said clutches for operating said connecting means to close said gate.

3. An automatic gate in accordance with claim 2 further characterized by the provisions of electrical means for controlling said clutch-activating means and means pedally actuated by the person desiring passage.

4. An automatic gate in accordance with claim 3 further characterized by time-delay means for sustaining activation of the gate-opening clutch operation pending passage and means operable automatically by opening of the gate to effect closing movement thereof.

References Cited in the file of this patent

UNITED STATES PATENTS

| Number | Name | Date |
| --- | --- | --- |
| 554,819 | Hicks et al. | Feb. 18, 1896 |
| 1,405,315 | Moore | Jan. 31, 1922 |
| 1,700,433 | Cox | Jan. 29, 1929 |
| 1,775,849 | Cox | Sept. 16, 1930 |
| 1,846,514 | Drake | Feb. 23, 1932 |
| 1,928,698 | Morris | Oct. 3, 1933 |
| 2,170,014 | Ellis | Aug. 22, 1939 |
| 2,283,577 | Roby | May 19, 1942 |
| 2,536,489 | Burke | Jan. 2, 1951 |
| 2,639,142 | Morgan et al. | May 19, 1953 |
| 2,641,466 | Roby | June 9, 1953 |